United States Patent
Greenstreet et al.

(10) Patent No.: US 6,768,342 B2
(45) Date of Patent: Jul. 27, 2004

(54) SURFING LOGIC PIPELINES

(75) Inventors: Mark Greenstreet, Vancouver (CA); Brian Winters, Vancouver (CA)

(73) Assignee: University of British Columbia, Vancouver (CA)

(*) Notice: Subject to any disclaimer, the term of this patent is extended or adjusted under 35 U.S.C. 154(b) by 18 days.

(21) Appl. No.: 10/271,990

(22) Filed: Oct. 17, 2002

(65) Prior Publication Data

US 2003/0076131 A1 Apr. 24, 2003

Related U.S. Application Data

(60) Provisional application No. 60/330,287, filed on Oct. 18, 2001.

(51) Int. Cl.[7] ............................................. H03K 19/00
(52) U.S. Cl. .......................... 326/93; 326/95; 326/121
(58) Field of Search .......................... 326/93–98, 112, 326/119, 121, 26–28, 83

(56) References Cited

U.S. PATENT DOCUMENTS 5,300,831 A * 4/1994 Pham et al. .................. 326/44
5,392,423 A * 2/1995 Yetter ........................ 713/503
5,889,979 A * 3/1999 Miller, Jr. et al. .......... 713/503
6,590,424 B2 * 7/2003 Singh et al. ................. 326/93

* cited by examiner

Primary Examiner—Don Le
(74) Attorney, Agent, or Firm—Oyen Wiggs Green & Mutala (57) ABSTRACT

A surfing pipelined logic circuit has a timing system which provides a timing signal sequentially to each of a plurality of logic blocks. The logic blocks are connected in a series and may have a linear configuration or a ring configuration. Each of the logic blocks has a latency which is variable in response to the timing signal. When the timing signal is not present, the latency is longer than a timing delay which occurs between the timing system applying the timing signal to the logic block and the timing signal applying the logic signal to a next one of the logic blocks. When the timing signal is present, the latency is shorter than the timing delay. The timing system may comprise a timing path carrying timing signals. The timing path may have a number of nodes connected to control inputs of corresponding ones of the logic blocks.

29 Claims, 9 Drawing Sheets

SURFING LOGIC PIPELINES

CROSS-REFERENCE TO RELATED APPLICATION

This application claims the benefit of the filing date of U.S. application No. 60/330,287 filed on Oct. 18, 2001 which is hereby incorporated herein by reference.

TECHNICAL FIELD

The invention relates to logic circuits and, in particular to multi-stage digital pipelines.

BACKGROUND

Synchronous logic circuits have one or more stages of combinational logic. Logic signals pass through each stage in one clock cycle. Logic signals are latched after each stage. In synchronous logic circuits the maximum clock speed is determined by the slowest path through the combinational logic of any stage.

Wave pipelined logic circuits have been proposed. A review discussing such logic circuits is provided in W. P. Burleson, M. Ciesielski et al. *Wave pipe/lining: A tutorial and research survey*, IEEE Trans on VLSI Systems, 6(3):464–74, September, 1998. Wave pipelined logic circuits suffer from the disadvantage that timing uncertainty grows monotonically as events propagate through gates or other logic elements. Thus, such circuits must either operate at lower speeds or with fewer logic stages.

It is a standard technique to provide latches at points in pipelined logic circuits. Latches can hold data values and restructure signals propagating in such circuits. However, latches introduce latency.

There is a need for faster logic circuits.

SUMMARY OF THE INVENTION

The invention relates to logic circuits. One aspect of the invention provides a surfing pipelined logic circuit. The logic circuit has a timing system which provides a timing signal sequentially to each of a plurality of logic blocks. The logic blocks are connected in a series and may have a linear configuration or a ring configuration. Each of the logic blocks has a latency which is variable in response to the timing signal. When the timing signal is not present, the latency is longer than a timing delay which occurs between the timing system applying the timing signal to the logic block and the timing signal applying the logic signal to a next one of the logic blocks. When the timing signal is present, the latency is shorter than the timing delay. The timing system may comprise a timing path carrying timing signals. The timing path may have a number of nodes connected to control inputs of corresponding ones of the logic blocks.

Other aspects of the invention provide various surfing logic elements which may be used in surfing logic circuits.

Yet another aspect of the invention provides a logic pipeline comprising a series of logic stages each having a latency. An overall latency of the logic pipeline is less than a sum of the latencies of the logic stages.

Further aspects of the invention and features of specific embodiments of the invention are described below.

BRIEF DESCRIPTION OF THE DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides multi-stage logic pipelines. A circuit according to the invention comprises a sequence of logic blocks and a timing system. The timing system provides a timing signal sequentially to each of the logic blocks in the sequence. The latencies of the logic blocks are varied in response to timing signals provided by the timing system. Each of the logic blocks has a latency which is variable in response to the timing signal such that:

when the timing signal is not present, the latency is longer than a timing delay between the timing system applying the timing signal to the logic block and the timing signal applying the logic signal to a next one of the logic blocks; and, when the timing signal is present, the latency is shorter than the timing delay.

The timing system may comprise a timing path along which timing signals can propagate. Each of the logic blocks receives the timing signals at a corresponding point in the timing path.

Figure 1:
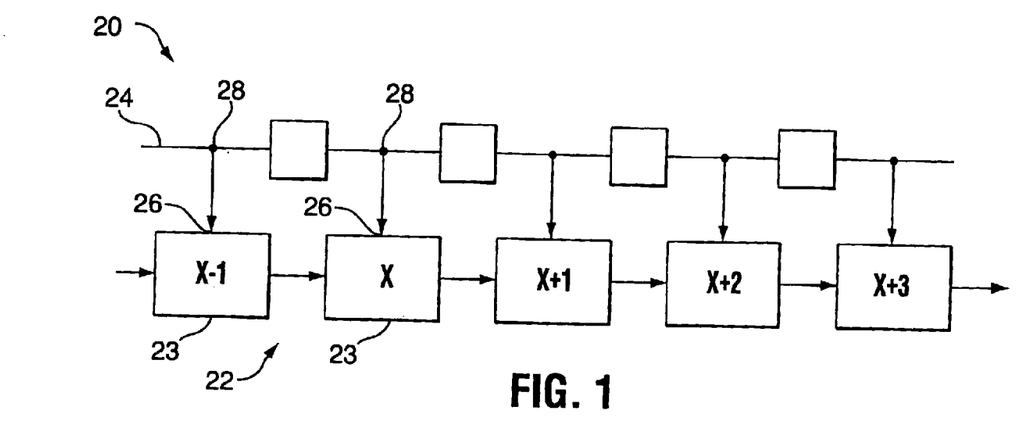
FIG. 1 is a block diagram illustrating a logic circuit according to the invention.

FIG. 1 illustrates a logic circuit 20 according to the invention. Circuit 20 comprises a logic chain 22 comprising a sequence of logic blocks 23 and a timing path 24. Each logic block 23 receives at a control input 26 a signal representing a state at a corresponding point 28 in timing path 24.

A portion of logic circuit 20 is shown in FIG. 1. Additional logic blocks 23 may be present in logic chain 22 before or after the illustrated logic blocks. Logic chain 22 may be arbitrarily long. In general, logic chain 22 of circuit 20 may comprise N logic blocks 23 where N is 2 or more. Logic blocks 23 may be different from one another. Each logic block 23 provides one or more logic values to the next logic block 23.

The latency of each logic block 23 is variable in response to the signal at control input 26. The latencies of logic blocks 23 therefore vary in response to timing signals propagating along timing path 24. In preferred embodiments, each logic block 23 can be switched between a low latency "fast" state and a higher latency "slow" state by asserting a signal at control input 26. A timing signal propagating along timing path 24 varies the latencies of blocks 23 in such a manner that the outputs of blocks 23 are available at times which correspond with the timing signal.

The maximum latency of a logic block 23 in its fast state may be given by $\delta_{fast,max}$, the minimum latency of a logic block 23 in its slow state may be given by $\delta_{slow,min}$, and the maximum and minimum delays taken for a timing signal in timing path 24 to propagate from a point 28 corresponding to one logic block 23 to a point 28 corresponding to a next logic block 23 may respectively be given by $\delta_{F,max}$ and $\delta_{F,min}$. It can be seen that where the timing signal comprises a pulse propagating along timing path 24 such that, when the pulse is present at a point 28, the corresponding logic block 23 is in its fast state then the time at which output signals from blocks 23 are available will tend to be attracted to the leading edge of the pulse as long as:

$$\delta_{fast,max} < \delta_{F,min} < \delta_{F,max} < \delta_{slow,min} \qquad (1)$$

That is, the propagation delay within each block 23 in the absence of a timing pulse is longer than the stage-to-stage delay within timing path 24 and the propagation delay within each block 23 in the presence of a timing pulse is shorter than the stage-to-stage delay within timing path 24.

Consider the case where the output(s) of logic block X change before the timing pulse is present at the corresponding point 28. The propagation delay in logic block X+1 will therefore be at least $\delta_{slow,min}$ This is longer than the time taken for the timing signal to propagate from one point 28 to the next (which must be somewhere between $\delta_{F,max}$ and $\delta_{F,min}$). Therefore, the timing signal will tend to catch up with the logic events. Conversely, if the output(s) from logic block X are ready after the timing signal has reached corresponding point 28 then the propagation delay for block X+1 will be at most $\delta_{fast,max}$. Since this is less than the time taken for the timing signal to propagate from one point 28 to the next, the logic events will tend to catch up to the timing signal.

Figure 2:
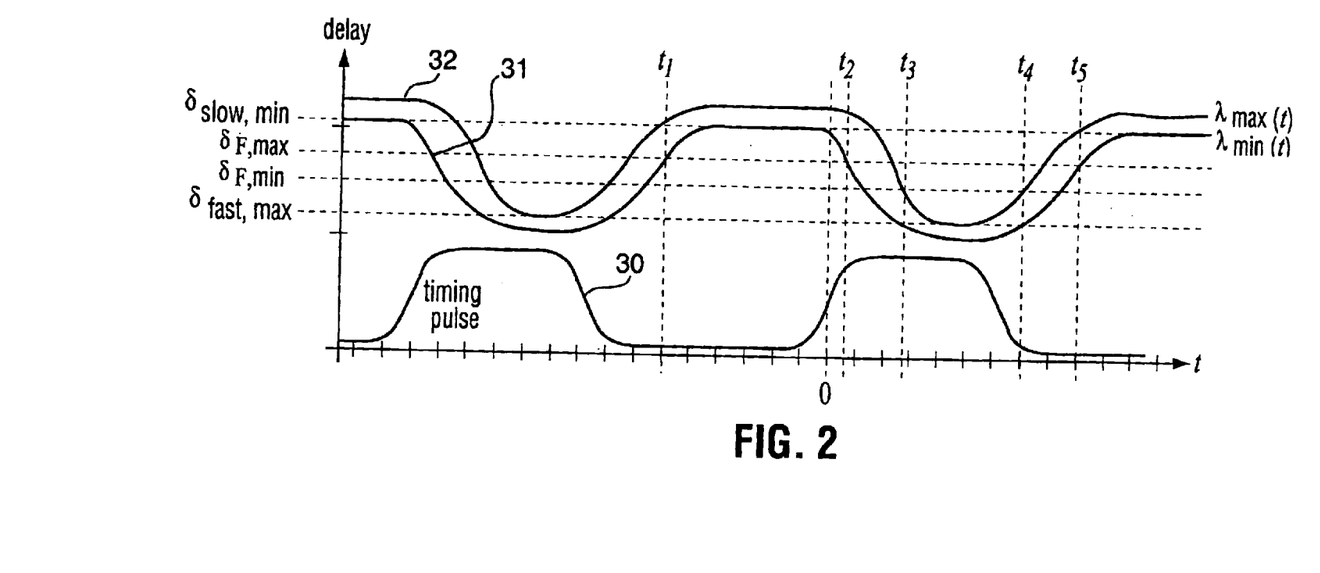
FIG. 2 is a graph illustrating the effect of a timing signal on the latency of a logic block in logic circuits according to some embodiments of the invention.

FIG. 2 shows how the propagation delays of logic blocks in circuit 20 vary with time. Line 30 represents a timing signal at a point 28 corresponding to a logic block 23. An input to a logic block 23 is an "enabling" event if it is the last input required to enable a transition in at least one output of the logic block 23. For a logic block 23, $\lambda_{min}(t)$ is the minimum delay from an enabling event to the corresponding output event where the enabling event occurs at time t after the arrival of a timing pulse. Likewise, $\lambda_{max}(t)$ is the maximum delay from an enabling event to the corresponding output event where the enabling event occurs at time t after the arrival of a timing pulse. Curves 31 and 32 of FIG. 2 show the variation of $\lambda_{min}(t)$ and $\lambda_{max}(t)$ with t. The delays of inequality (1) are represented as horizontal dashed lines in FIG. 2.

It can be seen from FIG. 2 that:

$$\delta_{slow,min} = \max_t \lambda_{min}(t) \qquad (2)$$

and, $$\delta_{fast,max} = \min_t \lambda_{max}(t) \qquad (3)$$

FIG. 2 shows times $t_1$ through $t_5$ which are described as follows:

$t_1$ is the time at which $\lambda_{min}(t)$ crosses above $\delta_{F,max}$ in response to the falling edge of the previous timing pulse;

$t_2$ is the time at which $\lambda_{min}(t)$ crosses below $\delta_{F,max}$ in response to the rising edge of the current timing pulse;

$t_3$ is the time at which $\lambda_{max}(t)$ crosses below $\delta_{F,min}$ in response to the rising edge of the current timing pulse;

$t_4$ is the time at which $\lambda_{max}(t)$ crosses above $\delta_{F,min}$ in response to the falling edge of the current timing pulse; and, $t_5$ is the time at which $\lambda_{min}(t)$ crosses above $\delta_{F,max}$ in response to the falling edge of the current timing pulse.

It can be seen that, if an enabling event occurs in the interval $[t_2, t_3]$ at one stage then all input events will occur in the interval $[t_2, t_3]$ in subsequent stages. Further, if the enabling event for one stage occurs in the interval $(t_1, t_4)$ then the input events at the next stage will occur within a smaller interval contained within $(t_1, t_4)$. The sequence of such intervals converges to $[t_2, t_3]$. The interval $(t_1, t_4)$ may be termed a "capture interval" for surfing. The interval $[t_2, t_3]$ may be termed a steady-state uncertainty. Events that occur in the interval $[t_4, t_5]$ might surf with the current timing pulse or "fall off" and slip to the next pulse.

Since the presence of a timing pulse speeds the operation of surfing gates, performance can be improved by making every gate in critical timing paths a surfing gate. Making every gate a surfing gate minimizes timing uncertainty.

Figure 3A:
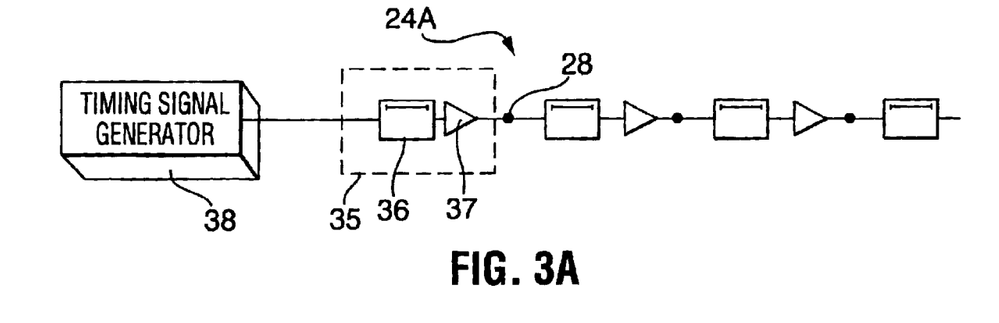
FIGS. 3A and 3B are schematic diagrams illustrating timing path circuits that may be used in the invention.

Timing path 24 and logic chain 22 may each be implemented in many different ways. FIG. 3A shows a timing path 24A according to one possible implementation. Timing path 24A comprises a chain of timing elements 35 which each comprise a delay 36 and a buffer 37. A timing signal generator 38 injects timing signal pulses at an input of timing path 24A.

Figure 3B:
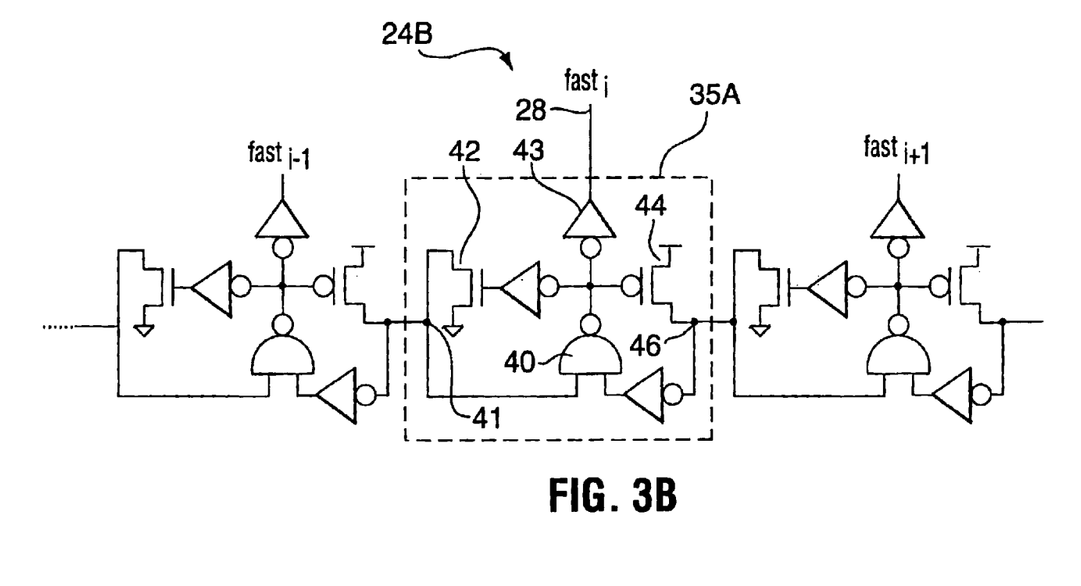

Timing signals preferably take no more time to propagate between nodes 28 of timing path 24 than the latency of the fastest logic block 23. In general, it is desirable to make the timing signals propagate as fast, or slightly faster than logic signals propagate in the fastest logic block. Where logic blocks 23 are very fast, timing path 24 must propagate signals quickly. Providing a self-timed chain for timing path 24 is desirable because self-timed chains can be implemented so that they do not to lose timing pulses. Further, self-timed chains may be made very fast. Self-timed chains may use handshaking to ensure that timing pulses are not lost. FIG. 3B shows a portion of a timing path 24B which may be used in the invention. Timing path 24B comprises a self-timed chain of GasP timing blocks 35A.

GasP circuits are a family of small, fast asynchronous circuits which use a single line handshaking protocol. Principles of design for GasP circuits are described in I. Sutherland and S. Fairbanks, *GasP: A Minimal FIFO Control*, ASYNC 2001: Seventh International Symposium in Asynchronous Circuits and Systems, IEEE, pp. 46–53 (2001); and I. Sutherland and J. Lexau *Designing Fast Asynchronous Circuits*, ASYNC 2001: Seventh International Symposium in Asynchronous Circuits and Systems, IEEE, pp. 184–193 (2001) both of which are hereby incorporated by reference herein.

Each timing block 35A comprises a NAND gate 40. NAND gate 40 may be self-resetting. When a pulse arrives at an input 41, the output of NAND gate 40 is driven low. This causes output 28 to be driven high by buffer 43 and causes transistors 42 and 44 to conduct. Transistor 42 pulls input 41 low and transistor 44 pulls output 46 high so that the pulse is passed to the next timing block 35A. NAND gate 40 then resets, thereby causing output 28 to be driven low by buffer 43.

Figure 4:
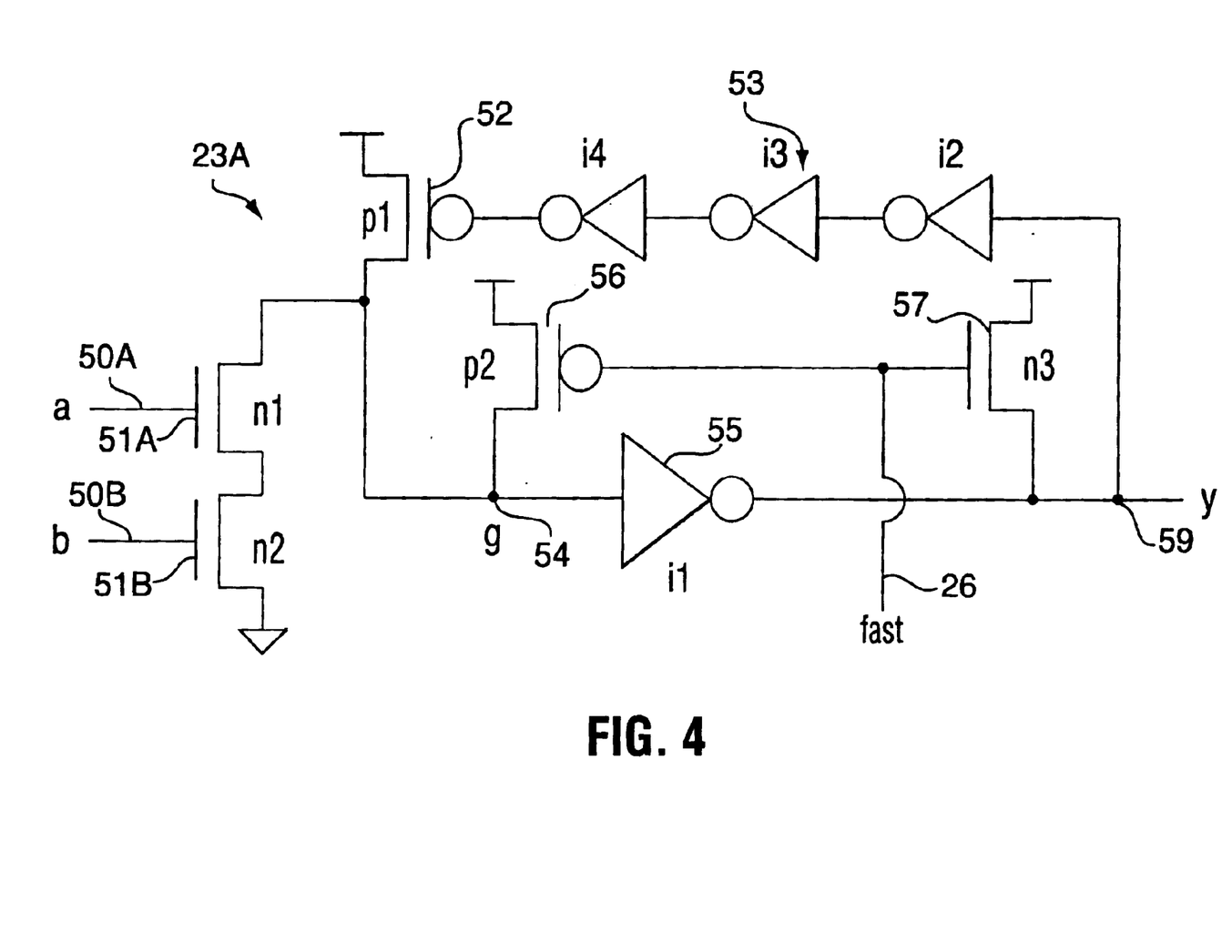
FIG. 4 is a schematic diagram of a surfing self-resetting domino AND circuit according to one embodiment of the invention.

Logic blocks 23 may have many different forms depending upon the logical functions that they are required to perform and upon the mechanism or mechanisms used to vary their latencies in response to the timing signal. One mechanism that may be used to vary the latency of a logic block is to provide a circuit which shifts a low output of a gate slightly higher when it is desired to increase a speed of a low-high transition. FIG. 4 illustrates a logic block 23A which comprises a self-resetting domino AND gate. Block 23A produces a pulse at its output if its inputs both receive a high-going pulse.

Block 23A has inputs 50A and 50B, a control input 26 and an output 59. When inputs 50A and 50B are both high, then transistors 51A and 51B conduct. This causes node 54 to be pulled low. Inverter 55 then causes output 59 to go high. The signal at output 59, as delayed by a delay chain 53, passes to precharge transistor 52. Precharge transistor 52 brings node 54 high again to reset block 23A. If either input 50A or 50B remains low then output 59 remains low as well.

When the signal at control input 26 is low:
transistor 56 conducts and functions as a keeper for node 54;
transistor 57 does not conduct;
transistors 51A, 51B and 56 are designed so that transistors 51A and 51B can overpower transistor 56 and cause an output pulse if inputs 50A and 50B are both high; and,
the current flowing in transistor 56 slows the transition of the output of inverter 55 to a high state in the event that inputs 50A and 50B are both high. This slight slowing of the transition increases the timing margins for surfing.

When the signal at control input 26 is high:
transistor 56 does not conduct; and
transistor 57 conducts.

If node 54 is high (and the output of inverter 55 is low) then transistor 57 pulls up the output of inverter 55 slightly. This may be called "preswitching". If node 54 subsequently becomes low then the current provided by transistor 57 reduces the delay which will occur between node 54 becoming low and the output of inverter 55 going high. If node 54 is in transition from high-to-low when the signal at control input 26 goes high then the extra current supplied by transistor 57 speeds up the transition. Thus, when control signal input 26 is high, a rising transition of output 59 will occur more quickly after inputs 50A and 50B both go high than it will when control signal input 26 is low.

Transistor 56 preferably has a small width to minimize capacitance at node 54.

In some embodiments, inverter 55 may comprise an N-channel pulldown transistor and transistor 57 may be designed to have a shape factor which is similar to or the same as that of the N-channel pulldown transistor of inverter 55. N-channel transistors operate more effectively to pull down than to pull up. Where transistor 57 is substantially equal in size to an N-channel pull-down transistor in inverter 55 then, when control signal input 26 is high, output 59 may have a level about 20% to 25% of that of the supply voltage $V_{dd}$ (where the circuit is fabricated using a typical CMOS process). This reduces the delay of logic block 23A by about 30% as compared to the delay when control signal input 26 is low.

Various trade-offs may be achieved by altering the size of transistor 57. Increasing the width of transistor 57 tends to increase the signal level at output 59 during times when node 54 is high and tends to decrease the delay of logic block 23A. This increases the robustness of the logic circuit to timing variations. On the other hand, increasing the signal level at node 59 brings the signal level closer to the switching threshold of the next logic block. This makes the circuit more susceptible to noise (the voltage noise margin is decreased). If the width of transistor 57 is made too large then the signal level at output 59 may become high enough to cause spurious output pulses at the next logic block 23.

Some embodiments of the invention use a dual rail encoding to carry logic signals. Dual rail systems provide a pair of lines for each logical value. A signal on a "true" line indicates that the logical value is true while a signal on the "false" line indicates that the logical value is false.

Figure 5:
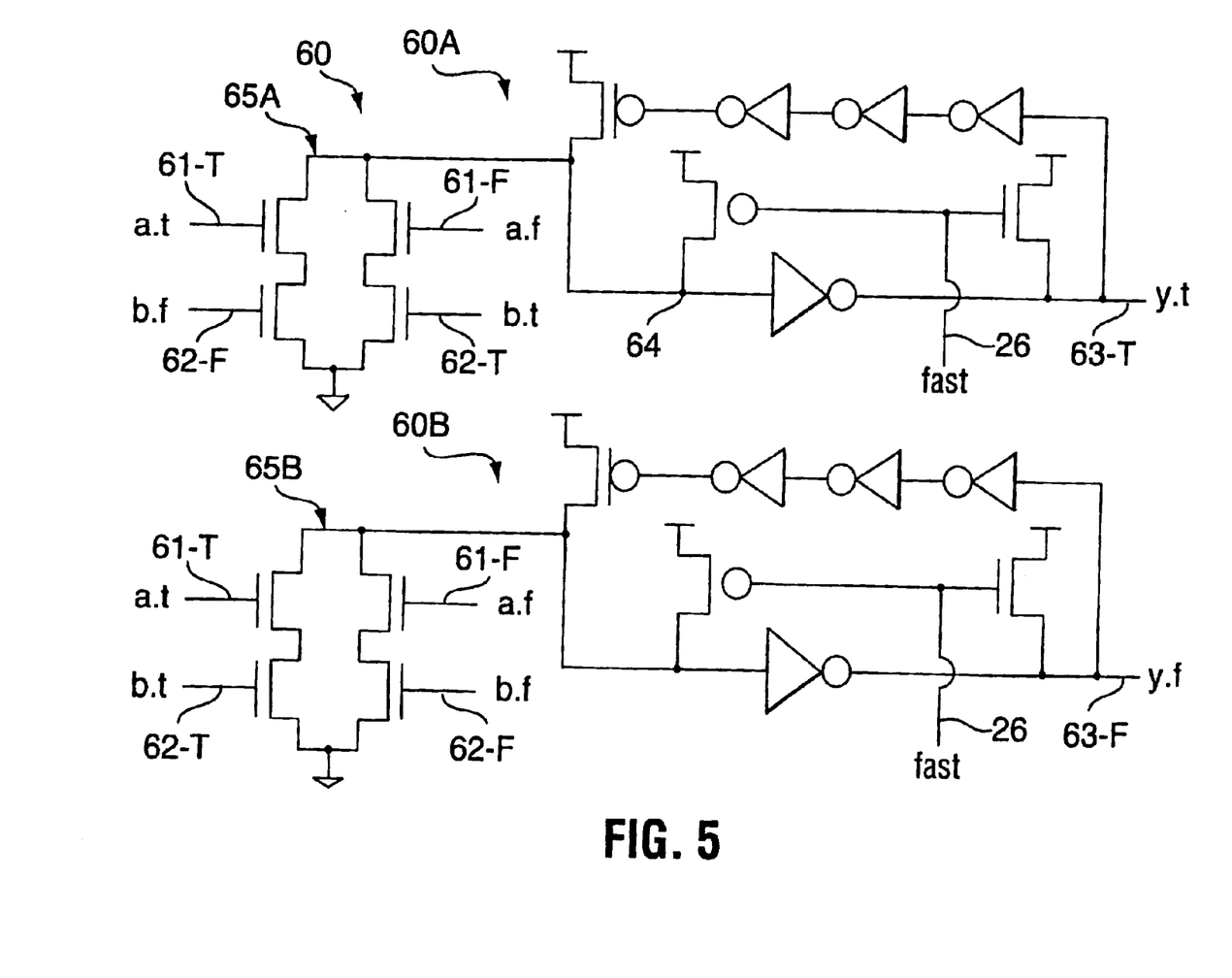
FIG. 5 is a schematic diagram of a dual rail surfing XOR circuit according to one embodiment of the invention.

FIG. 5 shows an XOR gate 60 which may be used in the invention. Gate 60 comprises a "true" part 60A having an output 63-T and a "false" part 60B having an output 63-F. XOR gate 60 receives two input signals 61 and 62. Each input signal is carried on two lines. Input signal 61 is carried on a first line 61-T which carries a pulse when signal 61 indicates a value of "true" and a second line 61-F which carries a pulse when signal 61 indicates a value of "false". Input signal 62 is carried on a first line 62-T which carries a pulse when signal 62 indicates a value of "true" and a second line 62-F which carries a pulse when signal 62 indicates a value of "false". XOR gate 60 produces a pulse at output 63-T if exactly one of input lines 61 and 62 carries a value of "true" and produces a pulse at output 63-F otherwise.

XOR Gate 60 can also perform as a multiplexer, AND gate, NAND gate, or other logic gate with different assignments of input lines to transistors in input sections 65A and 65B. Since such a multiplexer or other logic gate can have exactly the same topology as the XOR gate of FIG. 5, delays through such gates can be closely matched.

Figure 6:
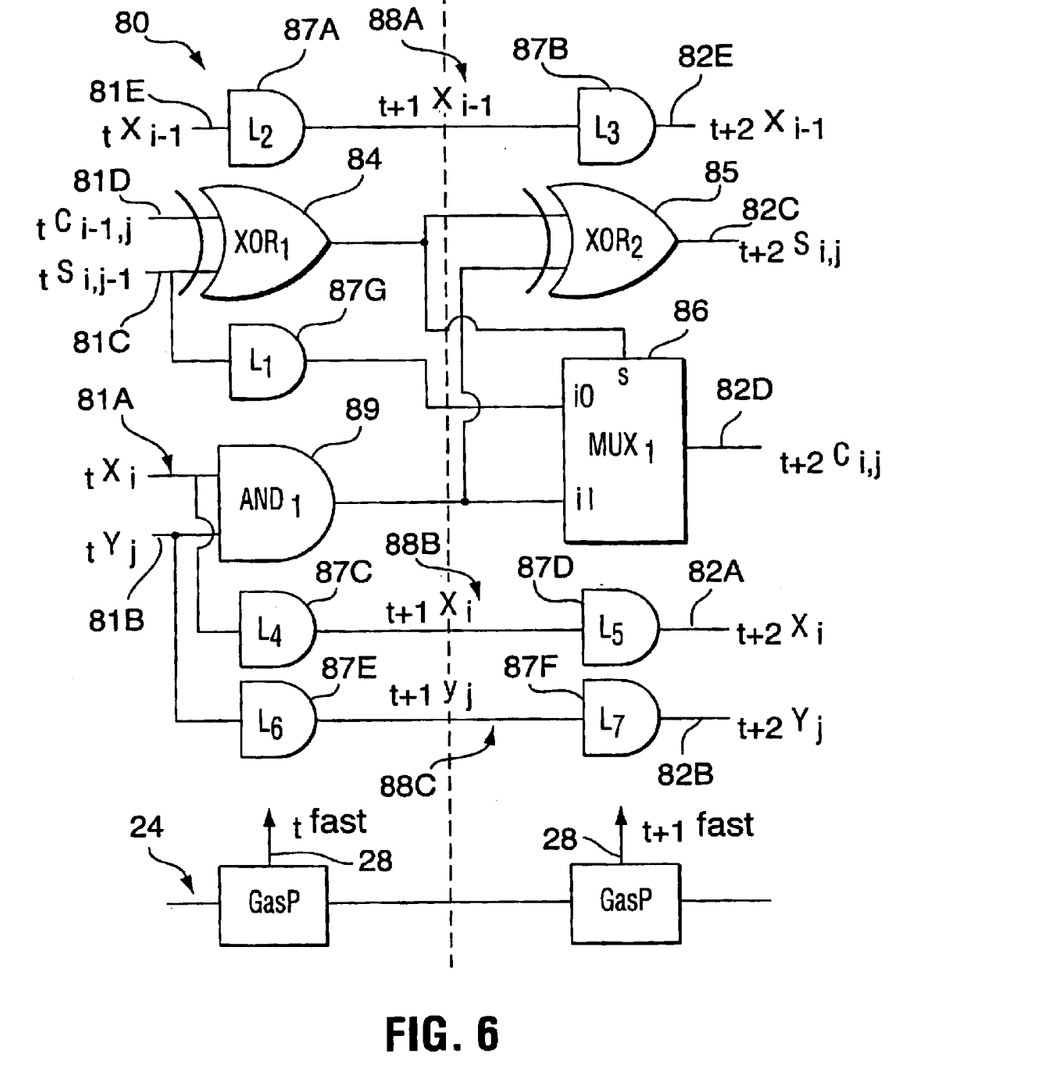
FIG. 6 is a schematic diagram of a multiplier cell incorporating surfing logic elements.

A multiplier is an example or one of many possible applications of the invention. FIG. 6 shows a multiplier cell 80. A radix-2 add-pass multiplier may be constructed by connecting a plurality of cells 80 in series to form a linear logic pipeline and providing a timing path 24. Each cell 80 can be considered to occupy two adjacent logic blocks 23 (see FIG. 1). A multiplier may be constructed by connecting a number of cells 80 in a pipeline. Each cell 80 receives a timing signal from a corresponding point 28 of timing path 24.

Each cell 80 has inputs 81A through 81D (collectively inputs 81) and outputs 82A through 82D (collectively outputs 82). The inputs 81 of one cell 80 are connected to corresponding outputs 82 of a previous cell 80. In FIG. 6, x and y are the numbers to be multiplied, t represents the pipeline stage (i.e. t is an index representing the logic block 23), s and c are respectively the sum and carry outputs of a cell 80 and I and j are indices which represent the bits of x and y being multiplied in a multiplier cell 80.

Each cell 80 includes XOR gates 84 and 85 and a multiplexer 86. Each of these three gates may be constructed as shown in FIG. 4. In this case each line in FIG. 6 represents a pair of lines, a "true" line and a "false" line. Each cell 80 also comprises signal paths 88A, 88B and 88C (collectively signal paths 88) which pass signals through to the next cell 80.

Surfing logic gates may be combined with non-surfing logic gates in circuits according to the invention. The multiplier of FIG. 6 presents one example of a circuit in which timing of logic signals on some logic pathways is determined by surfing logic circuits and timing of logic signals along other pathways is managed in other ways. In addition to surfing logic gates, the multiplier of FIG. 6 uses pseudolatches to slow the propagation of logic signals in some paths. In the multiplier of FIG. 6, pseudolatches and other logic gates may be constructed to generate output pulses having widths which guarantee sufficient overlap of pulses at different inputs of downstream logic gates to operate the downstream logic gates.

It is important that the pulses which represent logic signals in the various outputs of each cell 80 should be asserted at times which overlap sufficiently that they can properly trigger the gates for which they are inputs. XOR gates 84 and 85 and multiplexer 86 may be constructed as surfing domino gates. Cell 80 provides pseudolatches 87A through 87F in data paths 88. Pseudolatches 87A through 87F delay pulses propagating along signal paths 88 and may also increase the widths of pulses propagating along signal paths 88.

Figure 7:
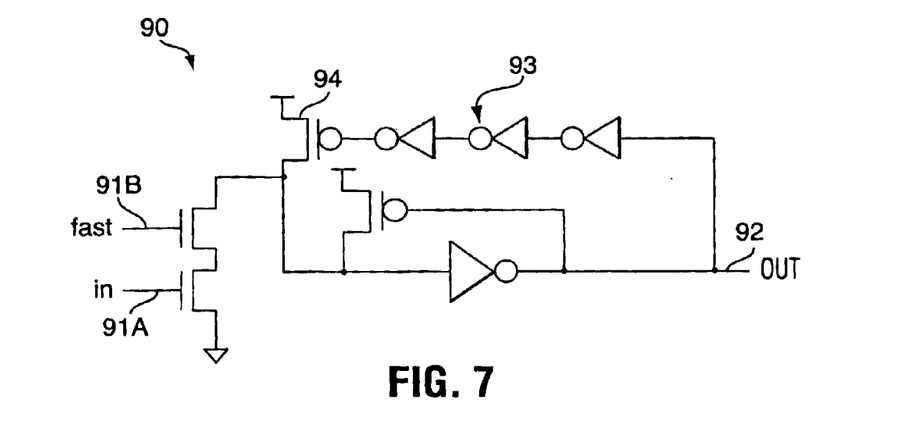
FIG. 7 is a schematic diagram showing a pseudolatch of the multiplier cell of FIG. 6.

FIG. 7 shows a pseudolatch 90. A pair of pseudolatches 90 may be used for each pseudolatch 87 in multiplier cell 80 of FIG. 6. Pseudolatch 90 has inputs 91A and 91B and an output 92. When pulses are present at both inputs 91A and 91B a pulse is generated at output 92. Pseudolatch 90 may be connected with input 91A and output 92 in a signal path 88 and input 91B connected to receive pulses of a timing signal at a corresponding point 28 in timing path 24.

Pseudolatch 90 is triggered when a timing pulse and an input pulse are respectively present at inputs 91A and 91B. This keeps signals travelling in signal paths 88 aligned with a timing pulse propagating in timing path 24.

Pseudolatch 90 is self-resetting. After pseudolatch 90 has been triggered, the signal at output 92 passes through a delay chain 93 to a precharge transistor 94. When the signal reaches precharge transistor 94, precharge transistor 94 resets pseudolatch 90. The length of the pulse produced at output 92 is determined principally by the delay provided by delay chain 93 rather than by the duration of the overlap of input pulses at inputs 91A and 91B. Surfing logic gates could be used in place of some or all of pseudolatches 87 at the expense of some complexity.

It can be seen from FIG. 6 that no latches are required in the multiplier. The design of circuits according to this invention may be optimized using any suitable optimization techniques. Some suitable techniques are described in I Sutherland et al., *Logical effort: Designing fast CMOS Circuits*, Morgan Kaufman Publishers Inc. Jan. 1999, which is hereby incorporated herein by reference.

Various techniques may be used in designing logic circuits in which the propagation delays of logic signals and timing signals for individual logic blocks or groups of logic blocks satisfy Equation (1). For example, transistor sizes may be varied to vary the latency of logic gates, the designs of logic gates may be varied, component values may be altered and/or additional circuit elements may be added in the logic or timing paths to achieve proper timing of the logic and timing signals propagating through a circuit according to the invention.

Figure 8:
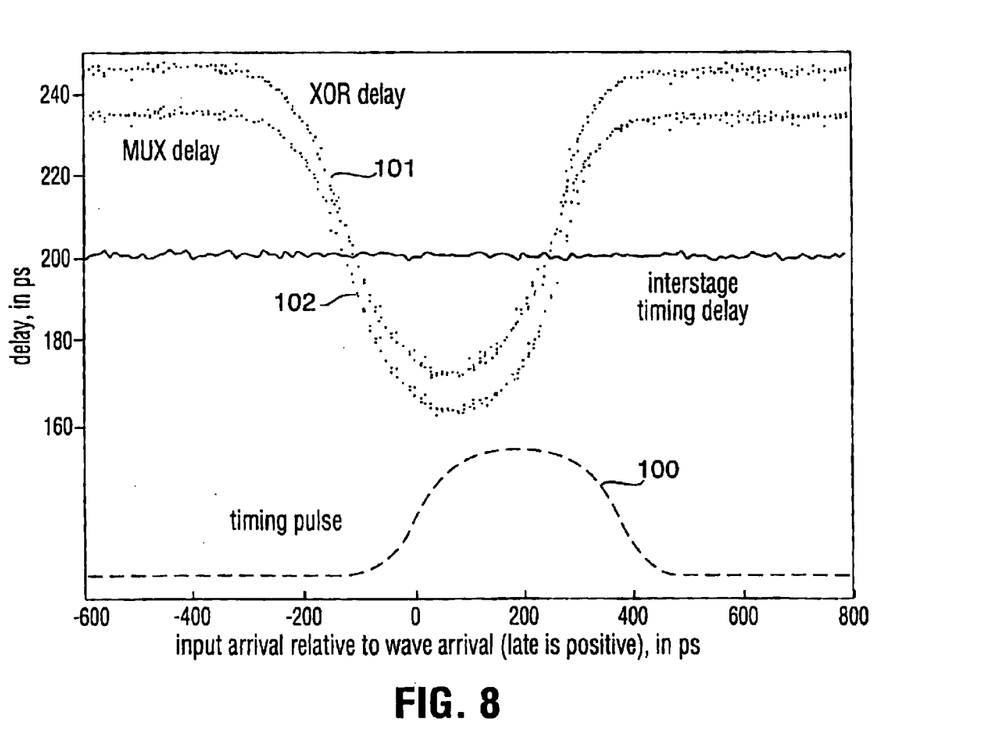
FIG. 8 is a graph illustrating latency of the circuit of FIG. 5 as a function of timing relative to a timing pulse.

FIG. 8 shows a curve 101 which shows the latency of a specific XOR gate 84 or 85 as a function of the time at which it receives input pulses relative to the time at which a timing pulse is provided at control input 26. Curve 102 shows the latency of multiplexer gate 86 under the same circumstances. It can be seen that for XOR gate 84, $\delta_{slow,min}$ is about 245 ps and $\delta_{fast,max}$ is about 173 ps. The timing pulse may have a duration of about 206 ps for example. Under these circumstances the inequality of Equation (1) is satisfied.

When the multiplier of FIG. 6 is operating in steady state, gates 84, 85 and 86 are operating in the region $[t_2, t_3]$ (see FIG. 2). In a specific embodiment of the invention the propagation delay through gates 84, 85 and 86 may be in the range of 199 ps to 213 ps. The delay between the arrival of a timing pulse at point 28 in stage t+1 of timing path 24 and the output of a pulse by one of gates 85 and 86 may be in the range of 77 ps to 82 ps.

For proper operation, there must be overlap between the pulses at the i0 and S inputs of MUX 86 as well as between the i1 and S inputs of MUX 86. The S input of MUX 86 arrives through XOR gate 84. The i0 input of MUX 86 arrives through pseudolatch 87G. In a specific example embodiment, the output from XOR gate 84 might arrive about 180 ps after a timing pulse at gate 84. If the delay from the timing pulse to the output of pseudolatch 87G is about 170 ps then there will be sufficient overlap to ensure the correct operation of MUX 86 as long as the pulses from XOR gate 84 and pseudolatch 87G are long enough. In the example embodiment, XOR 84 produces output pulses 344 ps long and pseudolatch 87G produces output pulses 350 ps long. This ensures an overlap of about 340 ps which is sufficient to ensure correct operation of MUX 86 in this example embodiment.

The i1 input of MUX 86 arrives by way of AND gate 89. The common event which determines the relative timing of pulses arriving at the i1 and S inputs of MUX 86 is the arrival of a timing pulse at XOR gate 85, MUX gate 86 and pseudolatches 87B and 87F of the previous cell 80.

The pulse for the S input of MUX gate 86 starts at gates 85 and 86 of the previous cell and continues through gate 84 of the current cell. The outputs of gates 85 and 86 of the previous cell 80 may occur about 180 ps after the arrival of a timing pulse at those gates. Also, the data-input-to-output delay of gate 84 is in the range of 199 ps to 213 ps, typically 206 ps. Therefore, the total delay from the timing pulse at gates 85 and 86 of the previous cell to a pulse arriving at input S of MUX 86 may be about 386 ps.

The pulse for the i1 input of MUX gate 86 starts at pseudolatches 87B and 87F of the previous multiplier cell 80 and continues through AND gate 89. Where dual rail logic is being used, AND gate 89 comprises two parts, a "true" part and a "false" part. The true part of AND gate 89 may comprise a surfing domino AND gate as shown in FIG. 4. Such an AND gate has delays similar to those of XOR gate 84. Where all other factors are equal, the delay provided by the surfing AND gate of FIG. 4 is slightly less than that of an XOR gate as shown in FIG. 5 because parasitic capacitances at node 54 are somewhat lower than they are at node 64. Overlap between a pulse which propagates through the "true" part of AND gate 89 and a pulse which propagates through XOR gate 84 can therefore be easily ensured.

Figure 9:
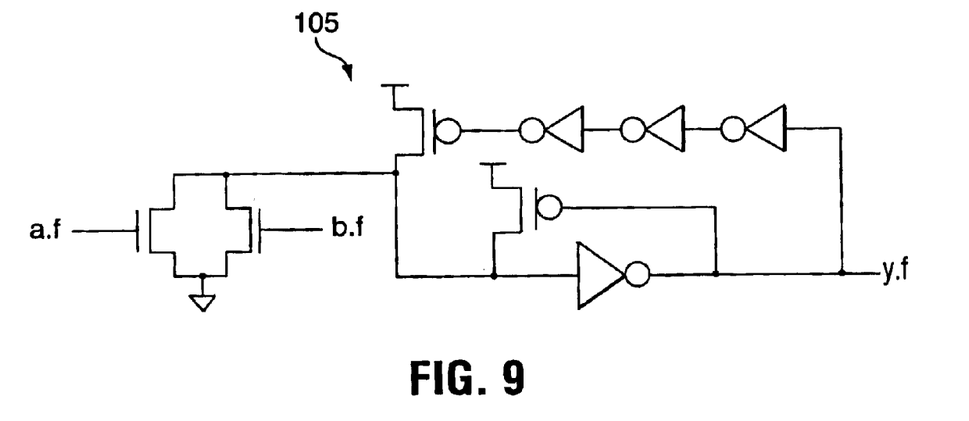
FIG. 9 is a schematic diagram showing a "false" side of a dual rail AND gate of the circuit of FIG. 5.

FIG. 9 shows a circuit 105 which may be used for the false side of AND gate 89. This gate provides a delay significantly less than that of XOR gate 84. When one of $_tx_i$ and $_ty_i$ is zero the delay through circuit 105 may be, for example, be about 161 ps. When both inputs are zero the delay may be reduced, for example, to 112 ps. This difference in timing may be addressed by introducing additional circuit elements, or modifying the design of circuit elements so that the path through the false side of gate 89 has a latency that more closely matches that of the path through the true side of AND gate 89. In some cases, however, the reduced latency of the false side of AND gate 89 may not be so much as to adversely affect the operation of cell 80.

In the specific example embodiment, the delay from the timing pulse at pseudolatches 87B and 87F to to the i0 input of MUX 86 may be about 170 ps. The total delay on this path may therefore be between about 282 and 331 ps. Thus the pulse at the i1 input of MUX 86 may arrive as much as about 104 ps before the pulse for the S input. If the pulse at the output of AND gate 89 has a sufficient width then there will be overlap between the pulses at the s and i1 inputs even in the presence of these timing uncertainties. If, for example, the output pulse of AND gate 89 has a width of 350 ps then there will be a minimum overlap of roughly 255 ps which is sufficient to ensure proper triggering of MUX 86. The timing of other signal paths through cell 80 may be analyzed in a similar manner.

Some example embodiments of the invention have been simulated using SPICE (Simulation Program with Integrated Circuit Emphasis), a computer program that predicts the operating characteristics of a circuit based upon the layout of the circuit and models of the behavior of circuit elements. In one example, a 4×12 version of the multiplier described above in relation to FIG. 6 and made using a 0.35 $\mu$m 3.3 V process was simulated. This circuit had 36 logic blocks. The simulation indicated that the circuit would operate correctly as a multiplier and that under appropriate operating conditions, eight timing pulses could be simultaneously maintained in flight with timing pulses being delivered into timing path 24 at a rate of 1.11 GHz.

Figure 10:
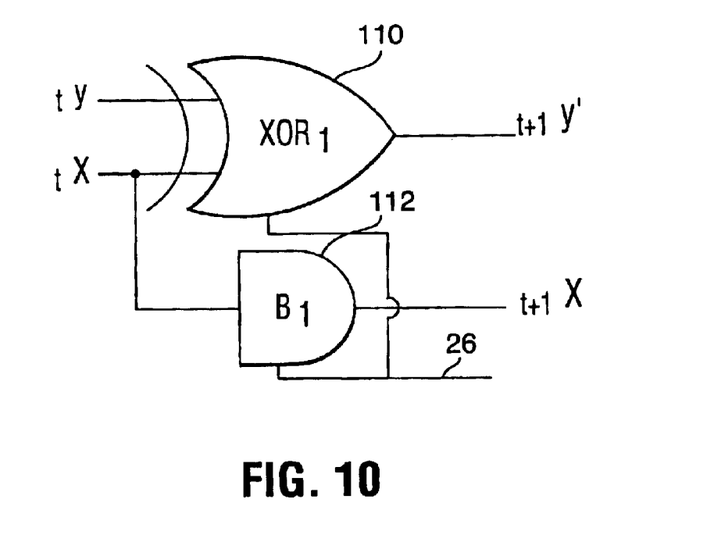
FIG. 10 is a schematic diagram illustrating one stage in a pipelined logic circuit according to an example embodiment of the invention.

Another embodiment of the invention which includes a chain of 256 XOR gates has also been simulated. As shown in FIG. 10, each stage of the chain includes a dual rail surfing domino XOR gate 110 constructed as shown in FIG. 5 and a pair of surfing domino AND gates used to provide a dual rail buffer 112. The AND gates were constructed as shown in FIG. 4. The simulation indicated that the circuit would operate correctly and that 58 timing pulses could be maintained in flight by issuing timing pulses into timing path 24 at a rate of 1.11 GHz.

In the embodiments of the invention described above, the pipelines have latencies which are less than the sum of the latencies of the individual combinational stages. This is because the delays of the logic elements are reduced in the presence of a timing pulse. Such pipelines may be said to have negative overhead.

The invention may be practiced with many different designs of surfing logic elements. These designs all share the characteristic that they exhibit lower latency in the presence of a timing signal, typically a timing pulse, than they do in the absence of the timing signal. FIGS. 11A, 11B, 11C and 11D illustrate some example self-resetting domino circuits which may be used as surfing logic elements in circuits according to this invention.

Figure 11A:
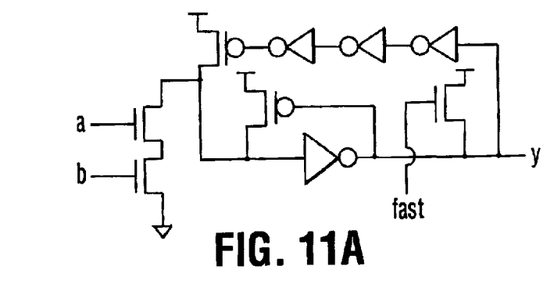
FIGS. 11A, 11B, 11C and 11D are schematic diagrams of self-resetting domino logic gates according to alternative embodiments of the invention.
Figure 11B:
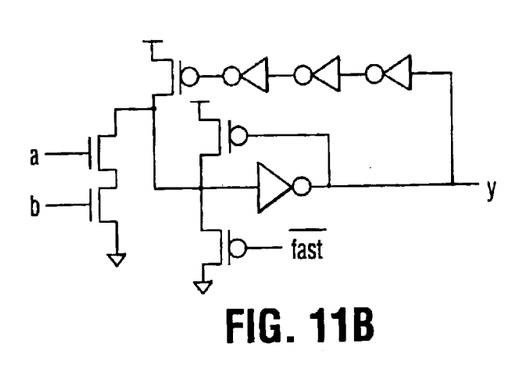
Figures 11C, 11D, 11E:
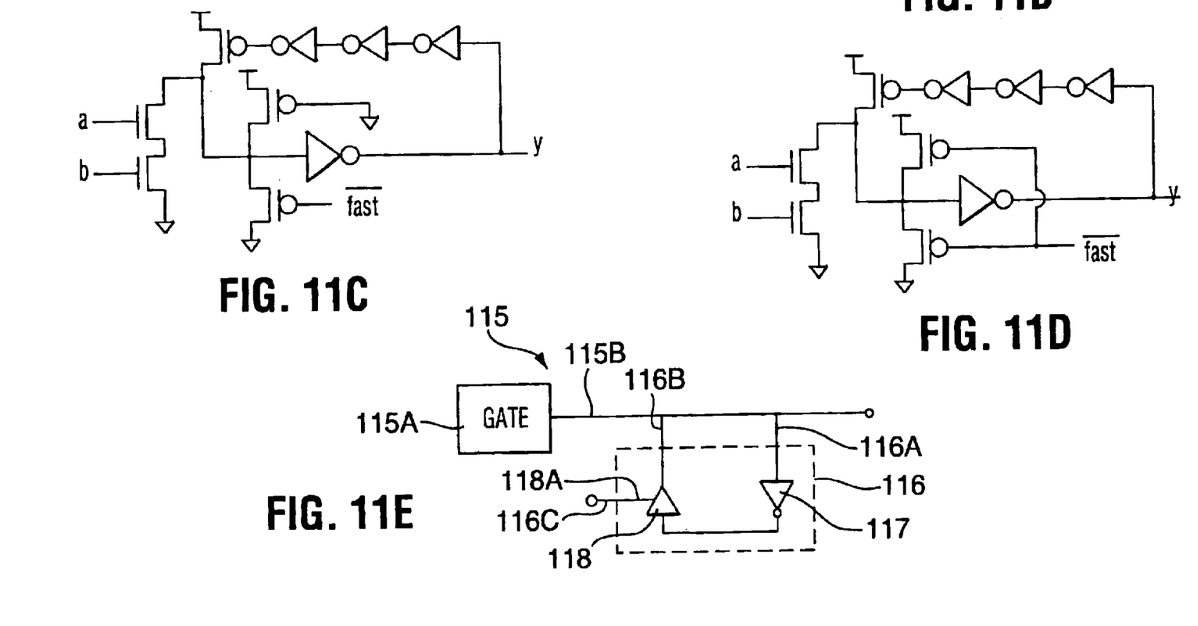
FIG. 11E is a schematic diagram of a surfing logic gate according to another alternative embodiment of the invention.

FIG. 11E shows a surfing logic gate 115 according to an alternative embodiment of the invention. Gate 115 comprises a logic circuit 115A which has at least one output 115B. Logic circuit 115A may be implemented using any suitable technology including using bipolar devices, CMOS, etc. A controllable inverting circuit 116 is connected to output 115B. Inverting circuit 116 has an input 116A coupled to output 115B, an output 116B connected to output 115B and a control input 116C connected to receive the timing signal. When the timing signal is present, inverting circuit 116 inverts the signal present at output 115B. Inverting circuit 116 attempts to pull output 115B down if it is high and attempts to pull output 115B up if it is low. Thus, when the timing signal is present, inverting circuit 116 performs preswitching regardless what is the state of output 115B.

In the illustrated embodiment, inverter circuit 116 comprises an inverter 117 and a tri-state buffer 118 having a control input 118A connected to control input 116C. Inverter circuit 116 could comprise other combinations of circuit elements configured to apply a preswitching signal to the output from logic circuit 115A when the timing signal is present.

In some embodiments of the invention, logic circuit 115A comprises an N-channel pull down transistor and a P-channel pull up transistor. In such embodiments, inverting circuit 116 may comprise an N-channel pull up transistor and a P-channel pull down transistor. The N-channel transistors in logic circuit 115A and inverting circuit 116 may be matched. For example, dimensions which affect the operation of the N-channel pull-up transistor and the N-channel pull-down transistor may be matched to within a factor of two or shape factors of the N-channel pull-up transistor and the N-channel pull-down transistor may be matched to within 20%. Since N-channel transistors operate better as pull-down transistors than as pull-up transistors, the N-channel transistor in logic circuit 115A will be able to overpower the N-channel pull up transistor in inverting circuit 116. The P-channel pull up transistor and P-channel pull down transistor may be similarly matched.

Figure 12:
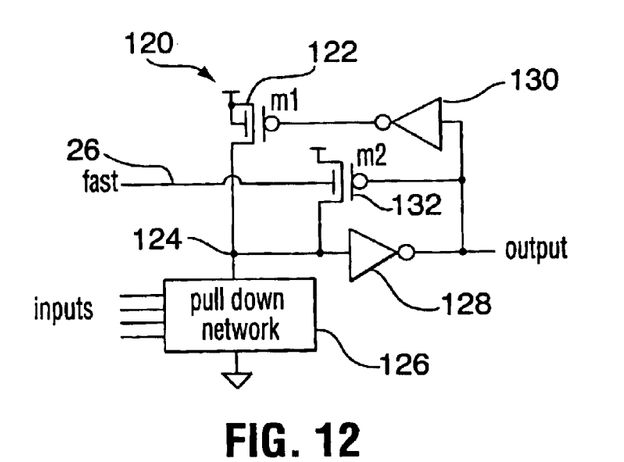
FIG. 12 is a schematic diagram of a surfing logic element according to an alternative embodiment of the invention having a variable-strength keeper.

The surfing logic elements do not necessarily need to have latencies controlled by preswitching. FIG. 12 shows a logic element 120 which has a precharge transistor 122 that precharges a node 124. A pulldown network 126 is controlled by one or more inputs. When an appropriate combination of one or more pulses arrives at the inputs, the pulldown network pulls node 124 down. This causes a pulse at the output of an inverter 128 which connects to an output of circuit 120. The output signal causes precharge transistor 122 to reset circuit 120 after a short delay by way of inverter 130. In circuit 120 control input 26 is connected to the bulk terminal of a keeper transistor 132.

When a timing signal at control input 26 is low (i.e. in the absence of a timing pulse) keeper transistor 132 has a first conductance. When the timing signal at control input 26 is high (i.e. in the presence of a timing pulse then transistor 132 has a second conductance lower than the first conductance. Thus, transistor 132 functions as a strong keeper in the absence of a timing pulse. When a timing pulse is present, transistor 132 has a weaker keeping effect and the latency of circuit 120 is reduced.

Figure 13:
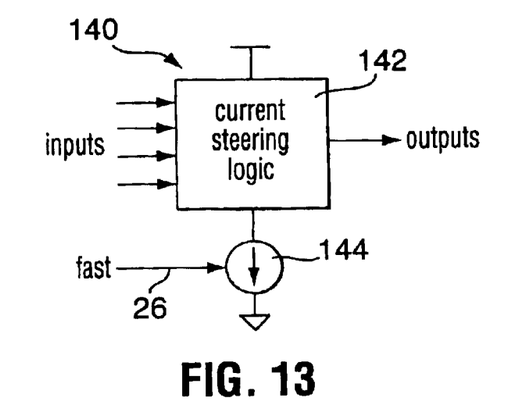
FIG. 13 is a block diagram of a surfing logic element according to another alternative embodiment of the invention having latency variable by a variable current reference; and, FIG. 14 is a block diagram of a logic pipeline having a ring configuration in which timing signals are provided via a transmission line of a power network.

Some logic families use current-steering to signal logic transitions. Such logic families typically provide current references which can be varied to permit trade-offs between speed and power. This capability can be used to provide surfing logic elements which may be used in this invention. FIG. 13 shows such a circuit 140 schematically. Circuit 140 includes a current-steering logic circuit 142 which operates at a speed determined by a variable current reference 144. Current reference 144 is coupled to control input 26 and configured so that, in the presence of a timing pulse at control input 26 the speed of current-steering logic circuit 142 is increased. Since logic signals are typically processed close to a timing pulse, this design permits circuit 140 to provide high speed operation while consuming reduced power between timing pulses.

The latency of logic gates can be affected by power supply voltage. This characteristic may be exploited by using the power supply network which serves the gates in a logic pipeline as a timing path. Surfing may be achieved by increasing the voltage of the power supply which serves logic gates in a logic pipeline at appropriate times.

Some embodiments of the invention create a traveling wave in the power-ground network, which acts as a transmission line. Surfing may be achieved by matching the speed of the traveling wave to the speed at which logic signals propagate through the logic circuits being powered by the wave. Such matching may be accomplished by matching transistor parameters in the logic circuits to wiring parameters of the power-ground network. Variable capacitance devices, such as shunt varactors may be provided to adjust the speed of propagation of waves in the power-ground network.

Figure 14:
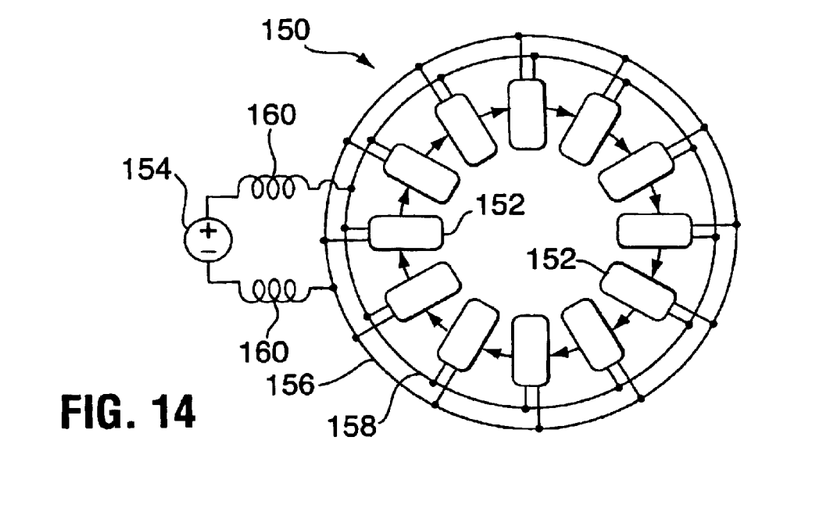

FIG. 14 shows a surfing logic pipeline 150 which exploits waves propagating in a power-supply network to induce surfing. Pipeline 150 has a number of logic blocks 152 arranged in a ring architecture. The gates of logic blocks 152 are powered by a power supply 154 which is connected to a ground ring 156 and supplies electrical power to a power rail 158. Inductors 160 may be provided to provide some AC isolation to the power supply. Power rail 158 and ground ring 156 are arranged as a transmission line in any suitable manner. Wood, J. et al., *Rotary traveling-wave oscillator arrays: a new clock technology*, IEEE Journal of Solid State Circuits 36(11) pp. 1654–1665, November 2001 describe examples of on-chip LC transmission lines with loop delays comparable to typical clock periods.

Switching currents of the devices in logic blocks 152 induce and drive a traveling wave around the transmission line. Consider the case where a voltage wave in the transmission line makes an upward crossing past its midpoint. Logic elements which are late will experience increased voltage and will speed up. Logic elements which are early will experience lower power supply voltages and will operate more slowly.

The invention provides logic pipelines arranged in rings as well as straight-line logic pipelines. Surfing logic elements which use pre-switching, variable strength keepers or current-steering can be arranged in both straight-line and ring architectures.

Where a component (e.g. an assembly, block, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example, It is not necessary that logic blocks change between their fast and slow states at any specific value of the timing signal. In the embodiments described above, a pulse in timing path 24 causes logic blocks 23 to switch from their slow states to their fast states. Alternative embodiments of the invention in which the presence of a timing pulse causes logic blocks 23 to switch from their fast states to their slow states are also possible. In such embodiments the phase and duty cycle of the timing signal are chosen for proper operation.

Logic blocks 23 may have states intermediate the fast and slow states.

logic blocks 23 do not all need to be identical as long as there is sufficient matching between the forward delays between points 28 in timing path 24 and propagation delays within logic blocks 23.

it is not necessary that the condition of Equation (1) apply to every logic block individually. Even if Equation (1) does not apply for one or more logic blocks, surfing behaviour can be maintained as long as Equation (1) applies to a group of blocks which includes the one or more logic blocks and the logic signals remain in the surfing capture interval for all surfing gates in the group of logic blocks.

While the logic chains in the example embodiments described above are linear, the invention could also be embodied in circuits which provide a ring or rings of logic blocks 23.

Slow buffers which are accelerated by the presence of a timing pulse could be used in place of pseudolatches 87 in the circuits described herein. This would likely be more complicated than the illustrated circuits and result in increased power consumption.

The foregoing circuits apply timing pulses to logic blocks by allowing a timing signal to propagate along a timing path. Timing signals may travel to different logic blocks along different timing paths as long as the timing paths are such that timing pulses are applied to the logic blocks at appropriate times.

In the foregoing examples the timing signal has been described as a pulse propagating in a timing path. The timing signal could equally be the absence of a signal on the timing path.

The timing path could comprise a self-timed ring.

Any timing system capable of providing suitable timing signals may be used. As will be apparent to those skilled in the art, the timing system may have various architectures. For example, instead of a linear or ring architecture, the timing system may have a star architecture in which timing signals are delivered to logic blocks over pathways, such as suitably designed transmission lines, which have different latencies. A timing signal generator which generates multi-phase timing signals may be used together with pathways which carry different phases to different logic blocks. These examples are intended to illustrate the generality of the invention and not to limit the choice of timing systems which may be used in this invention and which come within the scope of the appended claims.

While some embodiments of the invention above have been described as using dual rail logic gates, embodiments of the invention may use multi-rail logic gates having multiple outputs. Each output carries a signal, such as a pulse, if a corresponding logical condition is satisfied and does not carry a signal otherwise. Such gates are advantageous because the sense of transitions may be predetermined so that preswitching can be used as a convenient technique for controlling the latency of the gates.

Accordingly, the scope of the invention is to be construed in accordance with the substance defined by the following claims.

What is claimed is:

1. A logic circuit comprising:
   a timing system providing a timing signal sequentially to each of a plurality of logic blocks connected in a series,
   each of the logic blocks having a latency which is variable in response to the timing signal such that:
      when the timing signal is not present, the latency is finite and longer than a timing delay between the timing system applying the timing signal to the logic block and the timing system applying the timing signal to a next one of the logic blocks; and,
      when the timing signal is present, the latency is shorter than the timing delay.

2. A logic circuit according to claim 1 wherein the timing system comprises timing path carrying timing signals, the timing path having a number of nodes connected to control inputs of corresponding ones of the logic blocks.

3. The logic circuit of claim 2 wherein the timing signals comprise timing pulses and the timing system comprises a timing signal generator connected to inject the timing pulses into the timing path.

4. The logic circuit of claim 2 wherein the timing path comprises a self-timed pipeline.

5. The logic circuit of claim 4 wherein the self-timed pipeline comprises a sequence of stages connected to handshake using a GasP protocol.

6. The logic circuit of claim 3 wherein the timing path comprises a chain of stages, and each of the nodes lies between two stages of the chain of stages.

7. The logic circuit of claim 1 wherein at least one of the logic blocks comprises a logic gate comprising a self-resetting domino circuit having a latency controlled by the timing signal.

8. The logic circuit of claim 7 wherein the self-resetting domino circuit comprises a pull-up transistor connected to pull up a level of an output of the self-resetting domino circuit when the timing signal is present.

9. The logic circuit of claim 8 wherein the pull-up transistor comprises an N-channel pull-up transistor.

10. The logic circuit of claim 9 wherein the self-resetting domino circuit comprises an inverting gate having an output connected to the output of the self-resetting domino circuit and the inverting gate comprises an N-channel pull-down transistor.

11. The logic circuit of claim 10 wherein dimensions which affect the operation of the N-channel pull-up transistor and the N-channel pull-down transistor are matched to within a factor of two.

12. The logic circuit of claim 10 wherein shape factors of the N-channel pull-up transistor and the N-channel pull-down transistor are matched to within 20%.

13. The logic circuit of claim 7 wherein the self-resetting domino circuit comprises an inverter having an output coupled to an output of the domino circuit and a keeper transistor connected to pull up an input of the inverter wherein the timing signal is applied to vary a conductance of the keeper transistor.

14. The logic circuit of claim 13 wherein the timing signal is coupled to a bulk terminal of the keeper transistor.

15. The logic circuit of claim 7 wherein the self-resetting domino circuit comprises a pull-down transistor connected to pull down a level of an output of the self-resetting domino circuit when the timing signal is present.

16. The logic circuit of claim 1 wherein at least one of the logic blocks comprises a logic gate having an output, the logic circuit comprises an inverting circuit having an input coupled to the output of the logic gate, an output connected to the output of the logic gate, and a control input connected to receive the timing signal, wherein the inverting circuit is configured to apply an inverted output signal at the output of the inverting circuit to the output of the logic gate when the timing signal is present at the control line.

17. The logic circuit of claim 16 wherein the inverting circuit comprises an inverter and a tri-state buffer connected between the inverter and the output of the inverting circuit and the control input is connected to a control input of the tri-state buffer.

18. The logic circuit of claim 1 wherein at least one of the logic blocks comprises a logic gate having a latency determined by a current reference and the timing signal is connected to control the current reference so that the latency of the logic gate is reduced in the presence of the timing signal.

19. The logic circuit of claim 2 wherein the timing path comprises a power network connected to supply electrical power to the logic blocks and the timing signals comprise waves of increased power supply voltage propagating in the power network.

20. The logic circuit of claim 19 wherein the power supply network comprises a transmission line arranged in a ring.

21. The logic circuit of claim 1 wherein the logic blocks comprise multiple rail logic gates, each of the multiple rail logic gates comprising a true output connected to carry a pulse when a logical condition tested by the logic element is true and a false output connected to carry a pulse when a logical condition tested by the logic element is false.

22. The logic circuit of claim 1 wherein the logic blocks comprise logic gates each having outputs corresponding to each of a plurality of logical conditions wherein the logic gates are configured to produce a predetermined output signal on each of the outputs for which inputs of the logic gate satisfy the corresponding logical condition.

23. A variable latency logic gate for use in a surfing logic circuit, the logic gate comprising an output and a transistor connected to shift a voltage level of the output in a direction of an anticipated transition in response to a control signal.

24. The variable latency logic element of claim 23 wherein the transistor comprises a pull up transistor coupled between the output of the logic element and a voltage supply and the logic element has a self-resetting domino configuration.

25. The variable latency logic element of claim 24 wherein the transistor comprises an N-channel transistor.

26. The variable latency logic element of claim 25 wherein the self-resetting domino circuit comprises an inverting gate having an output connected to the output of the self-resetting domino circuit and the inverting gate comprises an N-channel pull-down transistor.

27. The variable latency logic element of claim 26 wherein widths of the N-channel pull-up transistor and the N-channel pull-down transistor are matched.

28. A logic pipeline comprising a series of logic stages each having a latency, wherein an overall latency of the logic pipeline is less than a sum of the latencies of the logic stages.

29. A logic circuit comprising:
   a timing system providing a timing signal sequentially to each of a plurality of logic blocks connected in a series,
   at least some of the logic blocks having a latency which is variable in response to the timing signal such that:
      when the timing signal is not present, the latency is finite and longer than a timing delay between the timing system applying the timing signal to the logic block and the timing system applying the timing signal to a next one of the logic blocks; and, when the timing signal is present, the latency is shorter than the timing delay;

wherein, a sum of the latencies of the plurality of logic blocks, as determined when the timing signal is not present, is longer than a sum of corresponding ones of the timing delays and a sum of the latencies of the plurality of logic blocks, as determined when the timing signal is present, is shorter than the sum of the corresponding timing delays.

* * * * *